3,611,746
CRYOSTAT FOR COOLING VACUUM-HOUSED
RADIATION DETECTOR
Helmut Marsing and Gerhard Weidmann, Neunkirchen,
Germany, assignors to Siemens Aktiengesellschaft,
Berlin, Germany
Filed Mar. 25, 1969, Ser. No. 810,198
Claims priority, application Germany, Mar. 26, 1968,
P 17 51 051.9
Int. Cl. F25b 19/00
U.S. Cl. 62—514          13 Claims

ABSTRACT OF THE DISCLOSURE

A loosely assembled cryostat of modular construction comprises a Dewar vessel having a reservoir of liquid gas refrigerant. A vacuum chamber is coupled to the Dewar vessel via a refrigerant transfer device and cooled by refrigerant from the reservoir. The vacuum chamber has a refrigerated surface for mounting a radiation detector to be cooled and electrical and evacuating couplings for independent evacuation of the vacuum chamber. The Dewar vessel has a nozzle opening into the area of the reservoir and the refrigerant transfer device includes the nozzle, which is in operative proximity with the refrigerated surface of the vacuum chamber.

DESCRIPTION OF THE INVENTION

The present invention relates to a cryostat. More particularly, the invention relates to a cryostat for cooling a vacuum-housed radiation detector.

Crystal detectors are used to indicate electromagnetic or corpuscula beams from infrared to gamma rays. When germanium detectors, which have a particularly high dissolution capacity, especially when irradiated with gamma rays, are used, considerable cooling is required. The cooling must be provided by a liquid gas such as, for example, liquid nitrogen, in order to decrease the detector noise to negligible values. For cooling purposes, the crystal detector is usually seated on a cold surface which is thermally coupled via its back portion to the cooling reservoir, located, for example, in a Dewar vessel. If the effected cooling is sufficient, the dissolution capacity of, for example, lithium-drifted germanium or GeLi detectors, is essentially limited to electronics, due to the electronic equipment connected to the output of the detector and to the influence of the capacitance of the detector. Even when the gamma ray energy was smaller, a dissolution capacity of approximately 1 kev. could be obtained. That is, the gamma energies which could be measured separately, differed only by 1 kev.

The constant cooling still presents technical difficulties, primarily due to the fact that the detector bodies must not only be constantly cooled, also outside operating periods, but must be positioned in vacuum chambers. Thus, cooling devices having a Dewar vessel, hereinafter described as cryostats, are desired which are easy to assemble and disassemble, so that the various parts of the cooling device may be exchanged and replaced by other or new parts. Thus, outside operating periods, the cooling chamber and the detector crystal are preferably cooled in so-called deep-cooling cabinets, by means of Dry Ice. Due to the shortage of space in such deep-cooling cabinets, the size of the detector chamber utilized presents a great problem of interference. A solid component of the evacuated or vacuum chamber always includes the evacuated jacket or housing of the cooling transfer device, which may comprise, for example, the housing of a cooling rod which extends into the liquid gas of the Dewar vessel during operation.

The principal object of the present invention is to provide a new and improved cryostat for cooling a vacuum-house radiation detector.

An object of the present invention is to provide a cryostat which overcomes the disadvantages of known cryostats.

An object of the present invention is to provide a cryostat which functions with efficiency, effectiveness and reliability.

In accordance with the present invention, a loosely assembled cryostat of modular construction comprises a Dewar vessel having a reservoir of liquid gas refrigerant. A vacuum chamber is coupled to the Dewar vessel via a refrigerant transfer device and cooled by the refrigerant from the reservoir. The vacuum chamber has a refrigerated surface for mounting a radiation detector to be cooled and electrical and evacuating coupling means for independent evacuation of the vacuum chamber. The refrigerated surface has a back portion. The Dewar vessel has a nozzle opening into the area of the reservoir and the refrigerant transfer device includes the nozzle. The nozzle is in operative proximity with the back portion of the refrigerated surface of the vacuum chamber.

The vacuum chamber has a recess formed therein in the area of the back portion of the refrigerated surface thereof and the refrigerant transfer device may comprise a heat transfer rod extending through the nozzle of the Dewar vessel and having one end immersed in the refrigerant in the Dewar vessel and the other end extending into the recess of the vacuum chamber and removably affixed to the back portion of the refrigerated surface. The heat transfer rod of the refrigerant transfer device comprises copper and the other end of the heat transfer rod is threadedly coupled to the back portion of the refrigerated surface. The nozzle of the Dewar vessel extends therefrom in an area above the level of refrigerant in the reservoir thereof and the heat transfer rod of the refrigerant transfer device extends through the nozzle with sufficient clearance to enable exhaust gas from the liquid gas refrigerant in the reservoir to pass through the nozzle out of the Dewar vessel into contact with the recess of the vacuum chamber thereby cooling said rod and the refrigerated surface of the vacuum chamber.

In another embodiment of the present invention, the vacuum chamber has a recess formed therein in the area of the refrigerated surface thereof and the refrigerant transfer device comprises a tube extending through the nozzle of the Dewar vessel. The tube has one end immersed in the refrigerant in the Dewar vessel and the other end extending into the recess of the vacuum tube in proximity with the back portion of the refrigerated surface of the vacuum chamber whereby the tube transfers refrigerant under pressure to the back portion of the refrigerated surface. A collar is provided on the tube in the area of the one end thereof. A spring on the tube in the area of the one end thereof abuts the collar at one end and extends beyond the tube at the other end in a manner whereby the spring abuts the vacuum chamber while the tube is still free of the vacuum chamber. The nozzle of the Dewar vessel extends therefrom in an area above the level of refrigerant in the reservoir thereof and the spring urges the collar into closing relation with the mouth of the nozzle when the spring abuts the vacuum chamber thereby sealing the Dewar vessel airtight so that the refrigerant is transferred from the reservoir of the Dewar vessel to the back portion of the refrigerated surface of the vacuum chamber via the tube in the manner of an artesian well.

The refrigerant transfer device may further comprise a heat transfer rod extending through the tube and having one end immersed in the refrigerant in the Dewar vessel and the other end extending into the recess of the vacuum chamber and removably affixed to the back portion of the refrigerated surface.

The nozzle of the Dewar vessel may extend therefrom in an area below the level of refrigerant in the reservoir thereof and the Dewar vessel may comprise a valve on the nozzle of the Dewar vessel for controlling the gas pressure in the area of the other end of the tube thereby controlling the flow of refrigerant from the reservoir to the tube by gravitational force.

The Dewar vessel may comprise a regulating valve for controlling the gas pressure in the Dewar vessel thereby regulating the flow of refrigerant from the reservoir to the tube.

The Dewar vessel may comprise a regulating valve on the nozzle of the Dewar vessel positioned to block the recess of the vacuum chamber when the collar closes the mouth of the nozzle for regulating the flow of refrigerant past the back of the refrigerated surface of the vacuum chamber.

The vacuum chamber comprises a container having the electrical and evacuating couplings and having the refrigerated surface therein and a removable cover for the container comprising material transparent to radiation to be detected by the radiation detector. The vacuum chamber may comprise a container having the electrical and evacuating couplings and having the refrigerated surface therein. An angular joint has another refrigerated surface for mounting a radiation detector to be cooled at one end thereof and an additional refrigerant transfer device coupled at one end thereof to the refrigerated surface of the container and at the other end thereof to the refrigerated surface of the angular joint. A removable cover for the angular joint comprises material transparent to radiation to be detected by the radiation detector.

The device of the present invention is excellently suited for cooling a radiaiton detector, arranged in a vacuum-insulated manner. The radiation detector may comprise a lithium-drifted germanium diode which is to be cooled to the temperature of liquid air or liquid nitrogen, that is, to approximately 100° K. The radiation detector should be positioned in a relatively small vacuum chamber the vacuum of which is automatically regenerated. As hereinbefore described, the refrigerant may be brought into contact with the vacuum chamber in two different ways during the mounting of the refrigerant reservoir, which may comprise, for example, a nitrogen Dewar vessel. One type of arrangement is the aforedescribed heat transfer rod and the other is the aforedescribed tube.

In another described embodiment of the present invention, the vacuum chamber of the Dewar vessel is sealed during the coupling of the vacuum chamber with the Dewar vessel via the collar of the refrigerant transfer tube, due to the action of a spring. The resulting excess pressure urges the liquid gas upward in the refrigerant transfer tube and said gas evaporates at the refrigerated surface of the vacuum chamber. Before the evaporated gas emerges from the device, it is preferably so guided that it reduces the heat losses of the vacuum chamber, even during the counter-flow of the gas. When the vacuum chamber and the radiation detector are cooled to the required temperature such as, for example, from 90 to 100° K., less refrigeration capacity is required. This may be achieved by opening a valve on the Dewar vessel in the area of the refrigerated surface. The adjustment of the valve permits continuous adjustment of the pressure in the Dewar vessel and adjustment of the cooling of the vacuum chamber. Thus, the cooling rate and the temperature are adjustable between —90 and —250° C., for example, depending upon the coolant or refrigerant, in the cryostat of the present invention.

In order that the present invention may be readily carried into effect, it will now be described with reference to the accompanying drawings, wherein.

In the figures, the same components are identified by the same reference numerals.

Figure 1:
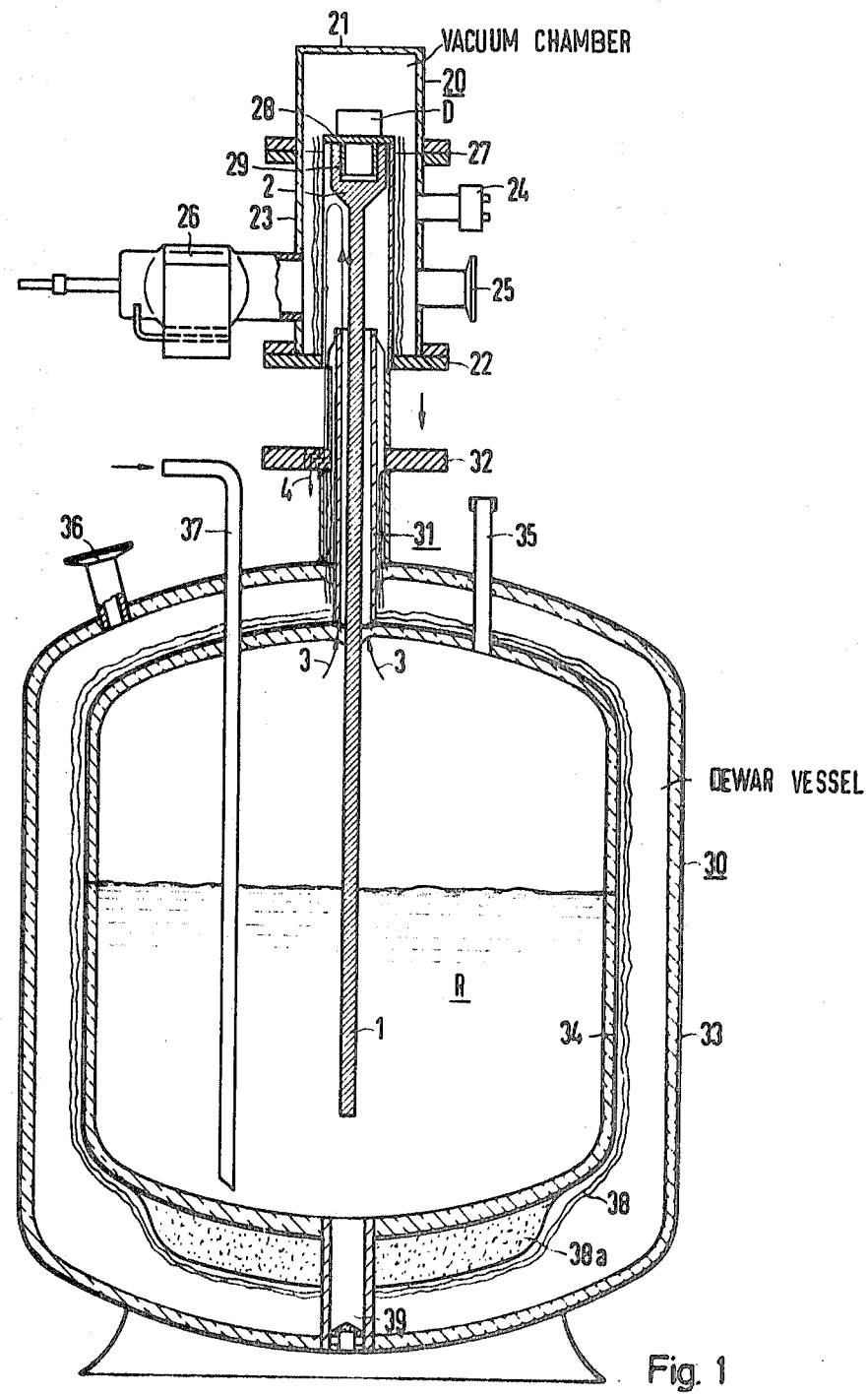
FIG. 1 is a view, partly in section, of a embodiment of the cryostat of the present invention.

In FIG. 1, a refrigerant transfer device comprises a heat conducting or heat transfer rod 1 which extends through a nozzle 31 of a Dewar vessel 30. The heat transfer rod 1 comprises a material having good heat conducting properties such as, for example, copper. The cryostat device of FIG. 1 is shown in unassembled condition. That is, the Dewar vessel 30 and a vacuum chamber 20 are not coupled to each other in FIG. 1.

During the assembly process, when the vacuum chamber 20 and the Dewar vessel 30 are coupled to each other, the flange 22 of said vacuum chamber and the flange 32 of said Dewar vessel are moved toward each other in the direction of the arrow until they are in abutment. The flanges 22 and 32 may be coupled or affixed to each other by bolts.

Figure 2:
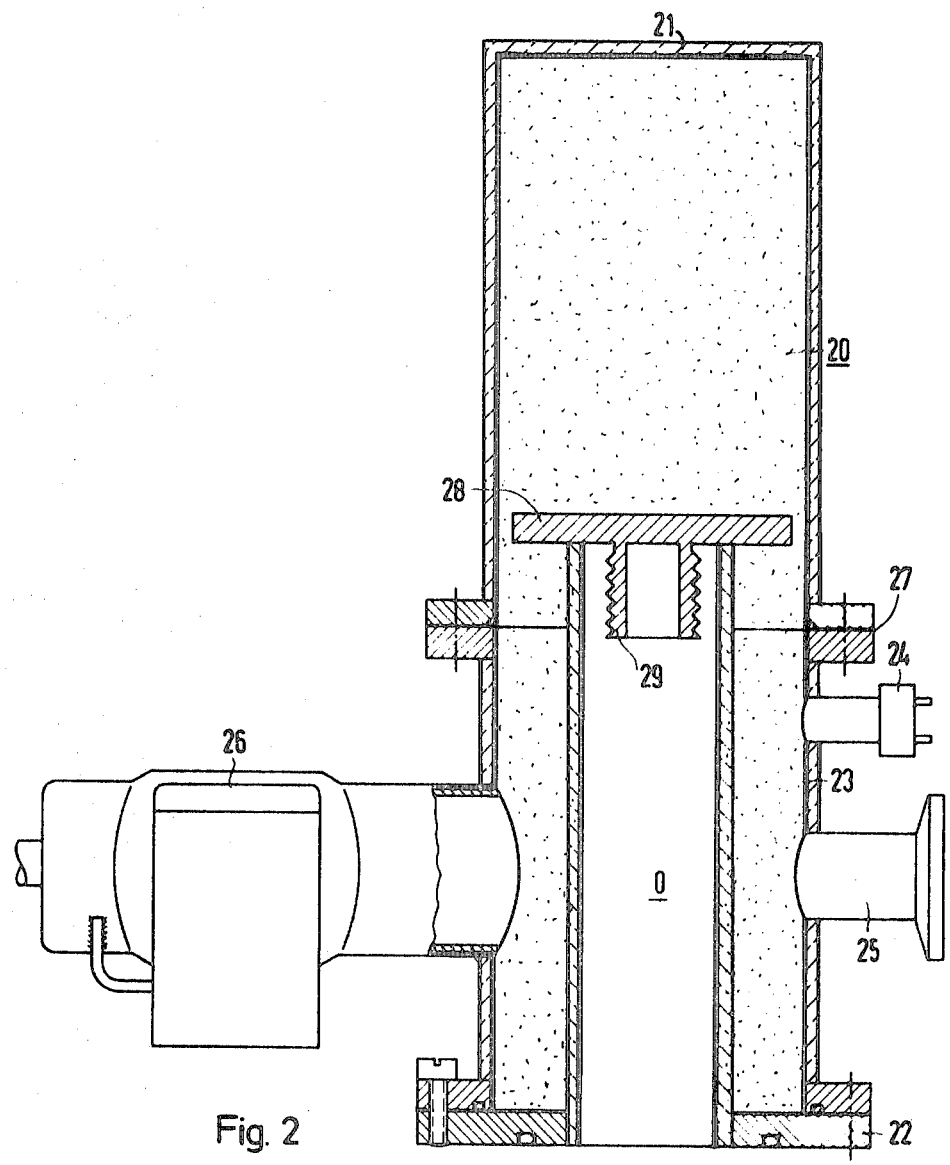
FIG. 2 is an enlarged view, partly in section, of the vacuum chamber of the cryostat of the embodiment of FIG. 1.
Figure 3:
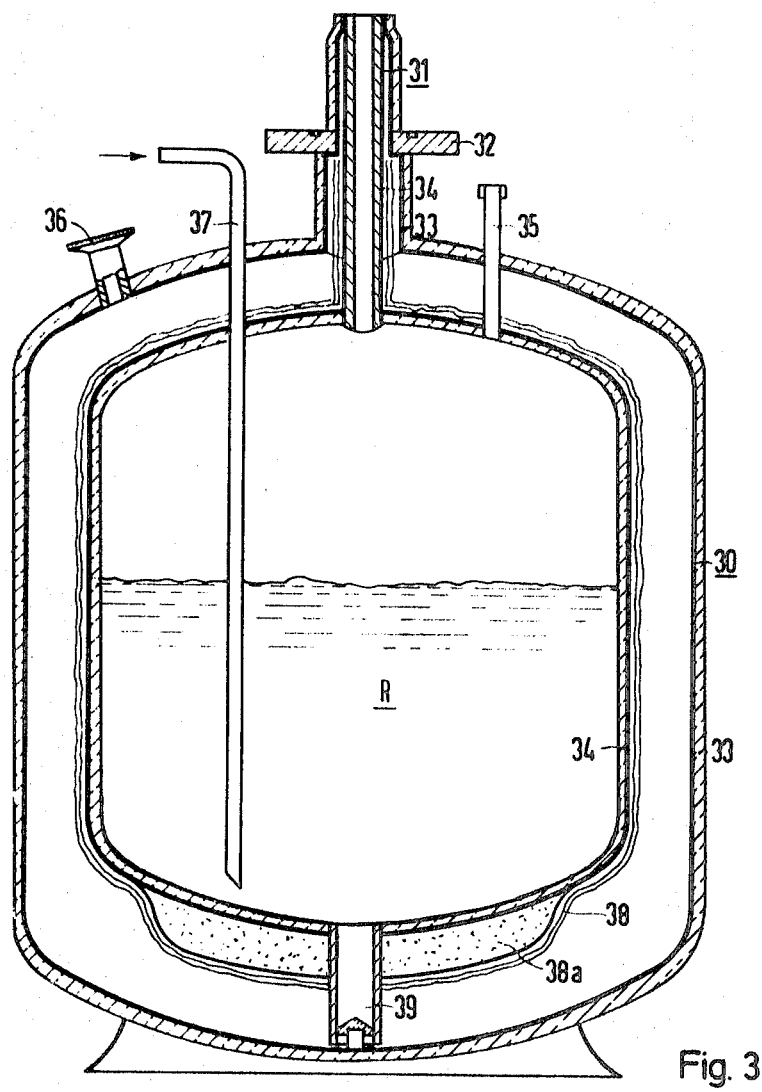
FIG. 3 is a view, partly in section, of the Dewar vessel of the cryostat of the embodiment of FIG. 1.

The vacuum chamber 20 and the Dewar vessel 30 are separately shown in FIGS. 2 and 3. The vacuum chamber 20 may basically comprise a container or vessel with an evacuated hollow wall. The vacuum of the vacuum chamber 20 is emphasized in FIG 2 by dots. The vacuum chamber 20 essentially comprises a container 23 and a removable cover 21 comprising material transparent to radiation to be detected by a radiation detector D (FIG. 1). The material of the cover 21 absorbs the radiation to be detected to a small extent only. The container 23 has an electrical coupling 24 and an evacuating coupling 25. The container 23 also has a coupling 26 for a permanent evacuation or vacuum pump such as, for example, an ion-getter pump.

The flange 22 of the vacuum chamber 20, which is to be affixed to the flange 32 of the Dewar vessel 30, constitutes the lowest part of said vacuum chamber. The cover 21 and the container 23 of the vacuum chamber 20 may also be affixed to each other by flanges 27 (FIG. 1). In FIG. 1, the cooling detector crystal D is seated on a refrigerated or cooling surface 28 which is part of the container 23 of the vacuum chamber 20.

The back portion 29 of the refrigerated or cooling surface of the refrigerated surface 28 is threaded so that it may be threadedly coupled to one end 2 of the heat transfer rod 1, which end is an internally threaded cap. The back portion 29 of the refrigerated surface 28 may be internally threaded and the end 2 of the heat transfer rod 1 may be externally threaded.

The Dewar vessel 30 of FIGS. 1 and 3 comprises an outer wall, vessel or jacket 33 and an inner wall, vessel or jacket 34. The Dewar vessel 30 has a lead-in tube 35 for indicating the level of coolant or refrigerant R in said Dewar vessel, a sealing valve 36 and an inlet conduit 37 for supplying the refrigerant or coolant. The space between the walls 33 and 34 of the Dewar vessel 30 may be evacuated by connecting a vacuum pump to the valve 36. The Dewar vessel 30 may also include reflecting foils 38 and activated carbon 38a in the space between the walls 33 and 34 The inner vessel 34 is centered with respect to the outer vessel 33 at the area 39. Both vessels 33 and 34 are affixed to each other at the upper end of the nozzle 31. The other end of the heat transfer rod 1 is immersed in the refrigerant or coolant R.

When the flange 22 of the vacuum chamber 20 is tightly affixed to the flange 32 of the Dewar vessel 30, the refrigerated surface 28 of said vacuum chamber is cooled by the heat conductance of the heat transfer rod 1. Moreover, the cryostat device of FIG. 1 is so constructed that it permits a flow of exhaust gas 3 to develop through the nozzle 31 of the Dewar vessel 30. The exhaust gas flows past the heat transfer rod 1 and the back portion 29 of the refrigerated surface 28, in the direction of the arrows and emerges from the device at an outlet 4, for example, as shown in FIG. 1.

In an embodiment example, the outer diameter of the vacuum chamber 20 was about 60 mm. and the diameter of the recess O (FIG. 2) formed therein was about 25 mm. The axial length of the vacuum chamber 20, including the flange 22, was approximately 150 mm. and the axial length of the container 23 was approximately 90 mm. The Dewar vessel 30 held approximately 10 liters of liquid gas and had an axial length of about 410 mm. from the bottom to the flange 32 and a diameter of about 300 mm. The cryostat device of FIG. 1 was approximately 56 cm high and had a diameter of about 30 cm.

Figure 4:
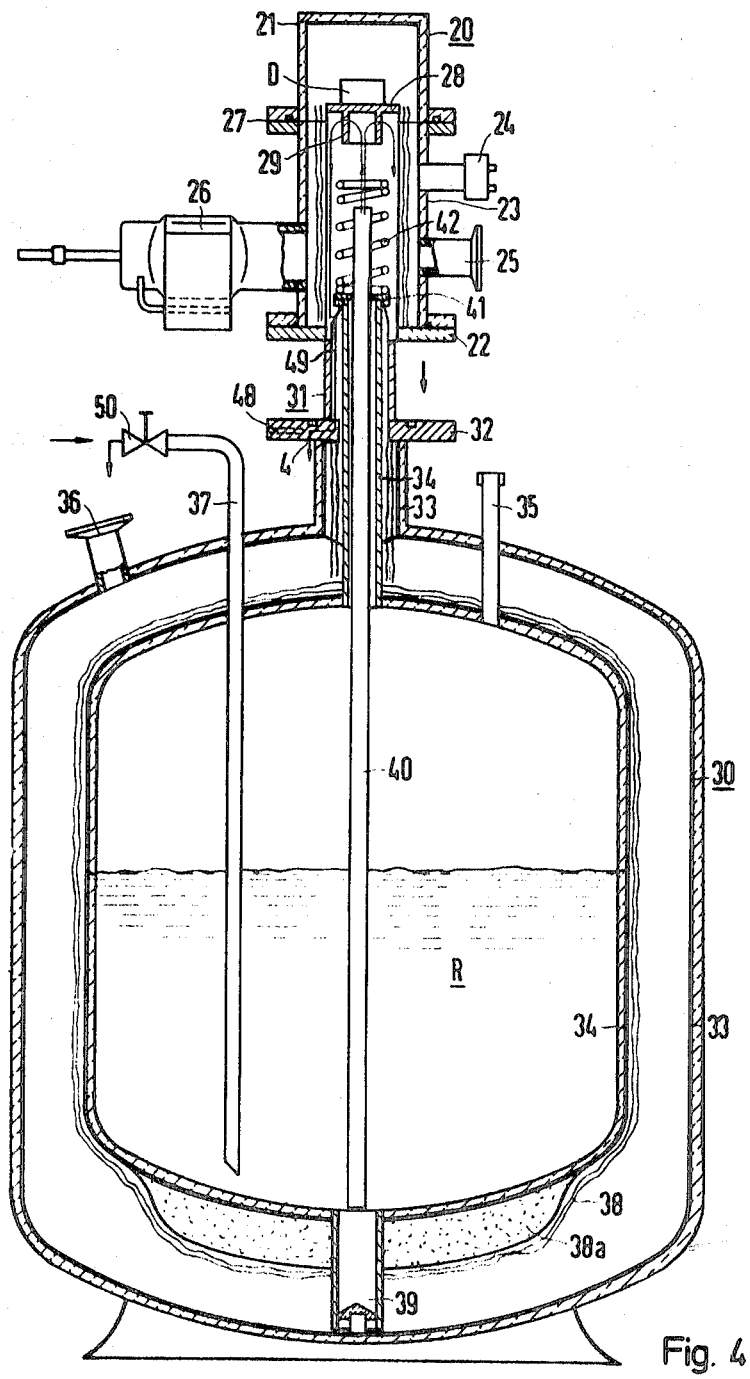
FIG. 4 is a view, partly in section, of another embodiment of the cryostat of the present invention.
Figure 5:
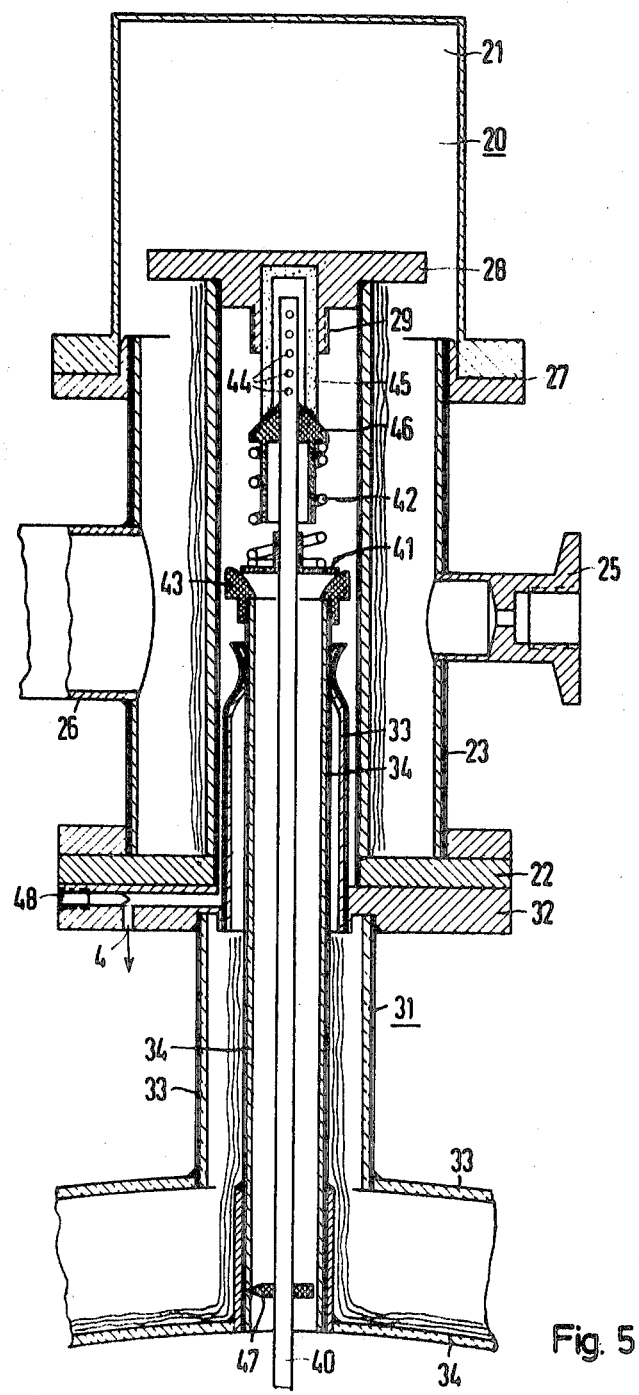
FIG. 5 is an enlarged view, partly in section, of the vacuum chamber of the cryostat of the embodiment of FIG. 4.

In the embodiment of FIG. 4, the refrigerant transfer device comprises a tube 40 which extends through the nozzle 31 of the Dewar vessel 30. One end of the tube 40 is immersed in the refrigerant or cooling R in the Dewar vessel 30 and the other end extends into the recess of the vacuum chamber 20 in proximity with the back portion 29 of the refrigerated surface 28 of said vacuum chamber. The tube 40 transfers refrigerant or coolant R under pressure to the back portion 29 of the refrigerated surface 28. FIG. 5 shows the vacuum chamber 20 of the embodiment of FIG. 4, with the liquid supply line drawn above the tube 40 and the nozzle 31 of the Dewar vessel 30 shown enlarged.

During the assembly of the cryostat device of FIG. 4, the vacuum chamber 20 and the Dewar vessel 30 are affixed to each other by joining their flanges 22 and 32, as indicated by the arrows in FIG. 4. The tube 40 has a collar 41 in the area of the end of said tube in the recess of the vacuum chamber 20. The collar 41 may be welded to the tube 40. A spring 42 is positioned on the tube 40 at the end bearing the collar 41 and abuts said collar at one end and extends beyond said tube at the other end. The spring 42 thus abuts the vacuum chamber 20 while said tube is still free from said vacuum chamber and urges the collar 41 against a Teflon sealing member 43 at the mouth of the nozzle 31 of the Dewar vessel 30.

The forcing of the collar 41 into closing relation with the sealing member 43 by the spring 42 causes the closing or sealing of the Dewar vessel 30. The tube 40 preferably has a plurality of holes 44 formed therethrough in the area of its end in the recess of the vacuum chamber 20 A contact body 45 of sintered metal, for example, is affixed to and extends from the back portion 29 of the refrigerated surface 28. A freely movable, conical-headed sleeve 46 may be positioned around the tube 40 and inside the spring 42 to guide said spring into the lower opening of the contact body 45. A three-prong spacer 47 is preferably affixed to the tube 40 at an area within the inside of the nozzle 31 or the inner vessel 34 to axially center said tube in said nozzle.

Since the Dewar vessel 30 is sealed airtight upon the coupling of the vacuum chamber 20 and said Dewar vessel, as shown in FIGS. 4 and 5, the refrigerant or coolant R is transferred from the reservoir of said Dewar vessel to the back portion 29 of the refrigerated surface 28 via the tube 40 in the manner of an artesian well. Due to the pressure resulting from the evaporation of the refrigerant or coolant liquid in the Dewar vessel 30, said refrigerant flows through the tube 40 and is sprayed against the back portion 29 of the refrigerated surface 28. The coolant evaporates on the back portion 29 of the refrigerated surface 28 and flows past the upper end of the outer jacket 33 of the nozzle 31 to the outlet point 4 in the flange 32.

A regulating member 48 (FIG. 5) may be provided for regulating the exhuast gas. The conduction of the exhaust gas and the control or regulation thereof is also well suited for the embodiment of FIG. 1. The flow of the coolant or refrigerant from the upper end of the tube 40, past the refrigerated surface 28, to the outlet 4 is indicated in FIG. 4 by the lines 49 and the arrows thereon.

When the refrigerated surface 28 is cooled down almost to the temperature of the liquid refrigerant or coolant, it is possible that a smaller amount of coolant will evaporate at said refrigerated surface than is being transferred thereto. It is then recommendable to decrease or throttle the supply of coolant. A valve 50 is provided on the Dewar vessel 30 in the liquid refrigerant supply conduit 37. The valve 50, which may comprise a needle valve, may be operated more or less as required in order to decrease or increase the pressure of the evaporated gas in the Dewar vessel 30 to such an extent that just as much coolant or refrigerant will be transferred upward through the tube 40 as will be evaporated at the back portion 29 of the refrigerated surface 28. Since the pressure of the evaporated coolant in the Dewar vessel 30 may increase considerably, for example, to 150 to 180 mm. of mercury, following the cooling of the vacuum chamber 20, it is advantageous that the tube 40 have a width of 1 mm. or less.

Figure 6:
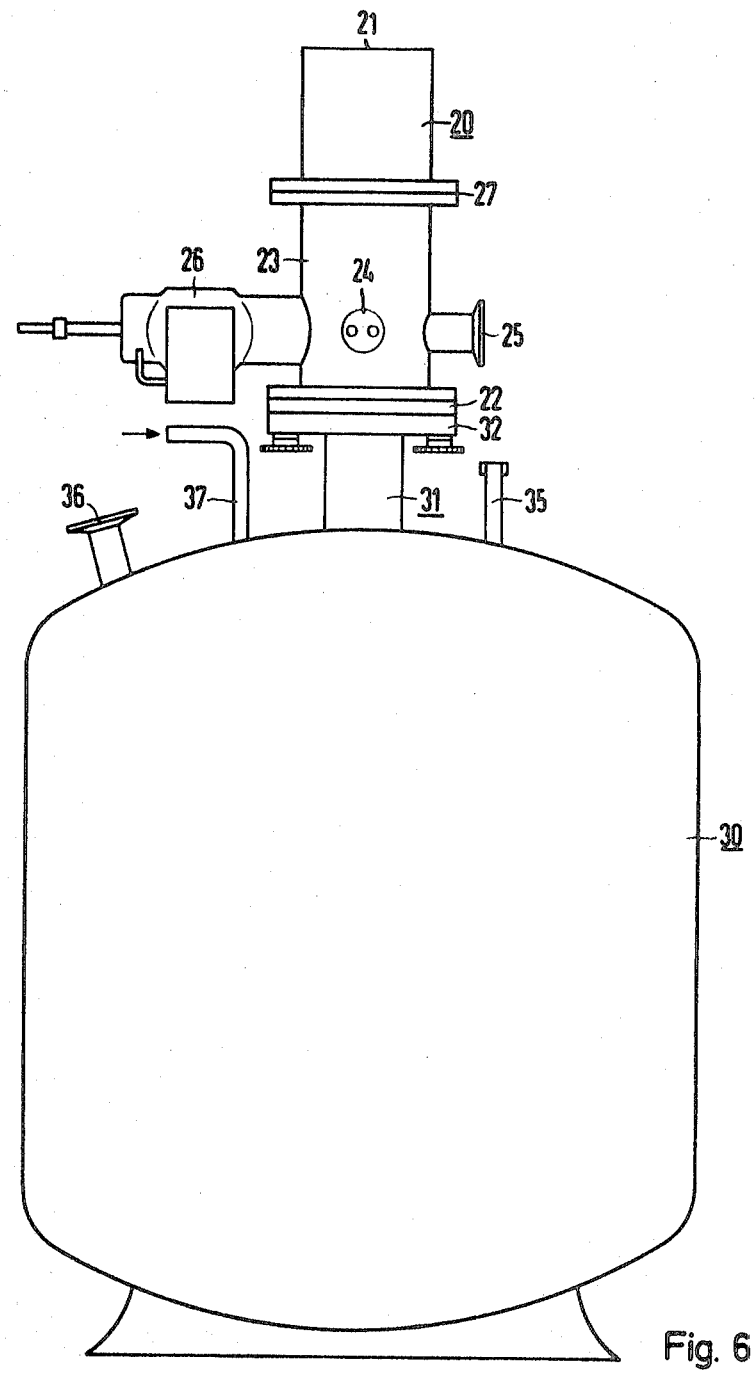
FIG. 6 is a view of an assembled cryostat of the present invention.
Figure 7:
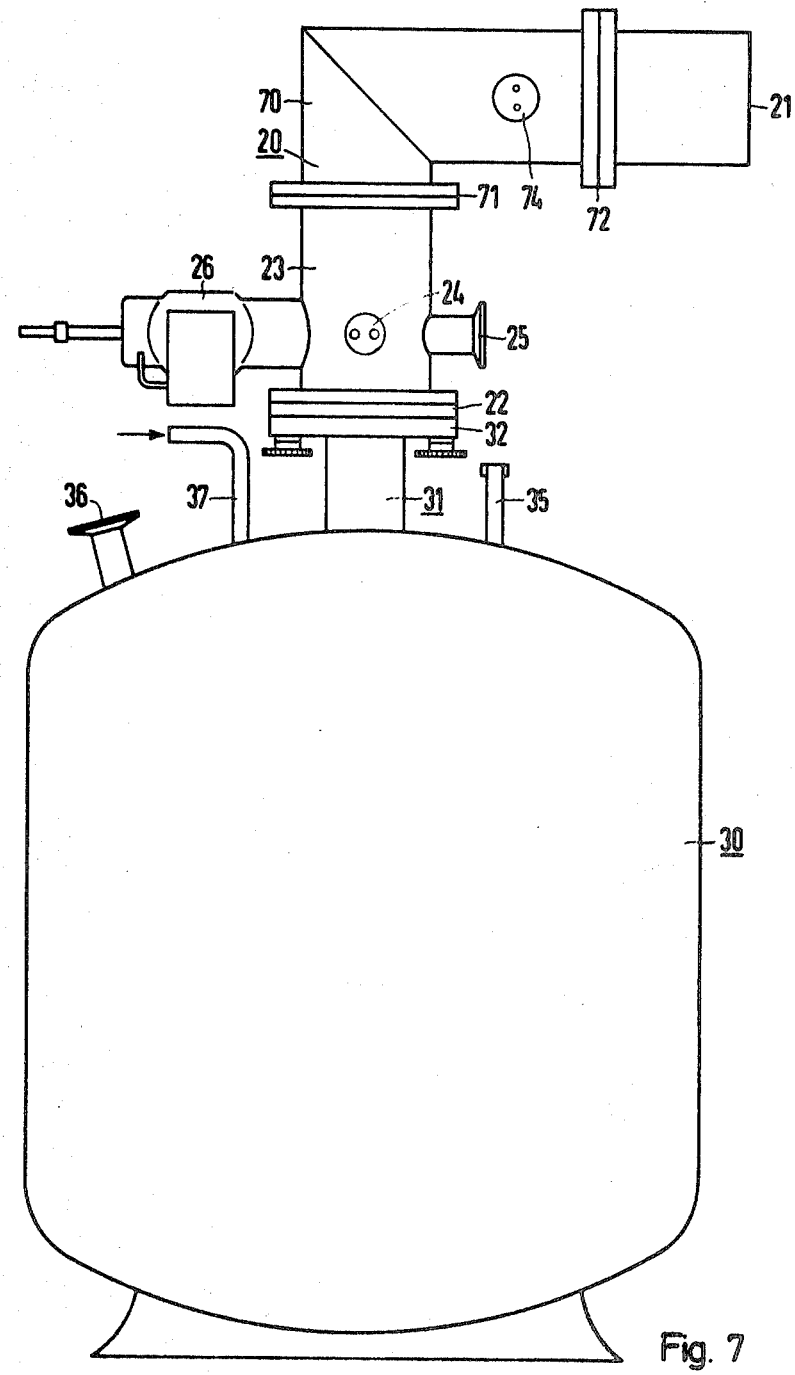
FIG. 7 is a view of an assembled cryostat of the present invention having another embodiment of a vacuum chamber.

FIGS. 6 and 7 are views of assembled cryostats of the present invention having different embodiment of the vacuum chamber 20. In each of FIGS. 6 and 7, the nozzle 31 of the Dewar vessel 30 is seated in the recess of the vacuum chamber 20 above the level of liquid refrigerant or coolant R in said Dewar vessel. The vacuum chamber 20 in the embodiment of FIG. 6 extends linearly, whereas the vacuum chamber 20 of the embodiment of FIG. 7 is bent at an angle of approximately 90°.

The essential difference of the embodiments of FIGS. 6 and 7 is that in the embodiment of FIG. 7, an angular joint or tube 70 is positioned between the container 23 and the cover 21. The angular joint or tube 70 is affixed to the container 23 by flanges 71 and to the cover 21 by flanges 72. The flanges are vacuum-tight as in the other embodiments of the present invention. The angular tube or joint 70 is a component of the vacuum chamber 20 in FIG. 7. The joint 70 has an electrical coupling or terminal 74 which in FIG. 7 may replace the coupling or terminal 24.

Figure 8:
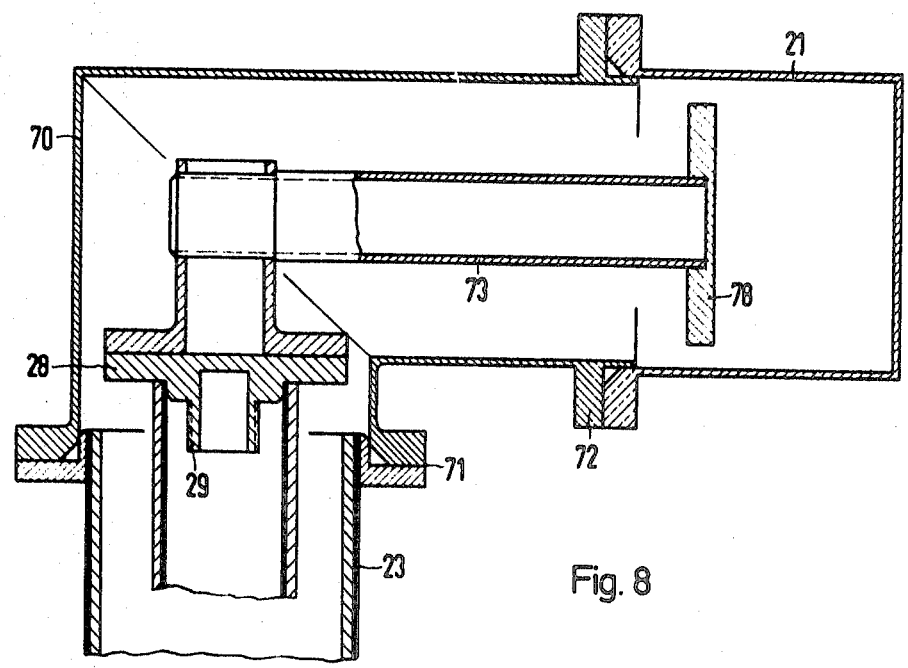
FIG. 8 is an enlarged view, partly in section, of the vacuum chamber of the cryostat of the embodiment of FIG. 7.

FIG. 8 is a sectional view of the angular joint or tube 70 on an enlarged scale. In the embodiment of FIG. 8, a refrigerating device is affixed to the refrigerated surface 28 of the container 23 by flange. The refrigerating device 73 is bent at substantially 90° and extends at one end to the cover 21. The refrigerating device 73 of the angular joint 70 has a second refrigerated surface 78 for mounting a radiation detecting crystal (not shown). The refrigerating device 73 preferably comprises a material with good thermal conductivity and may be constructed in form of a hollow angular tube or a full cylinder, bent at substantially right angles.

The advantage of a vacuum chamber of the type of

FIGS. 7 and 8, which is bent at substantially right angles, is that the source of the radiation to be indicated by the radiation indicator need no longer be at a point above the cryostat device of the present invention, but may be alongside said cryostat device. It is desired that the source of radiation be at a point beneath the cryostat device of the present invention, it is preferable to use the embodiment of FIG. 9 of the present invention.

Figure 9:
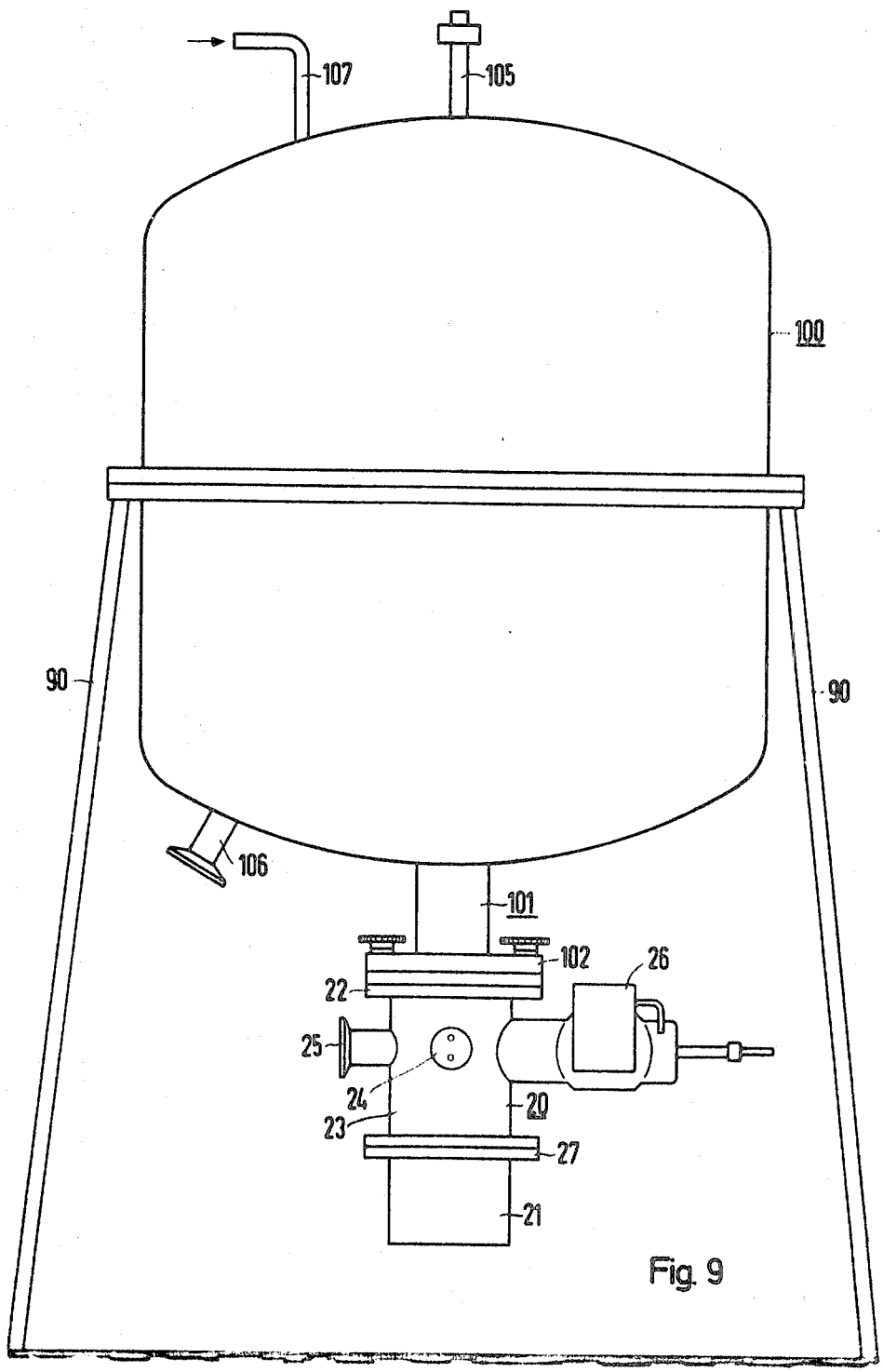
FIG. 9 is a view of the assembled cryostat of another embodiment of the present invention.
Figure 10:
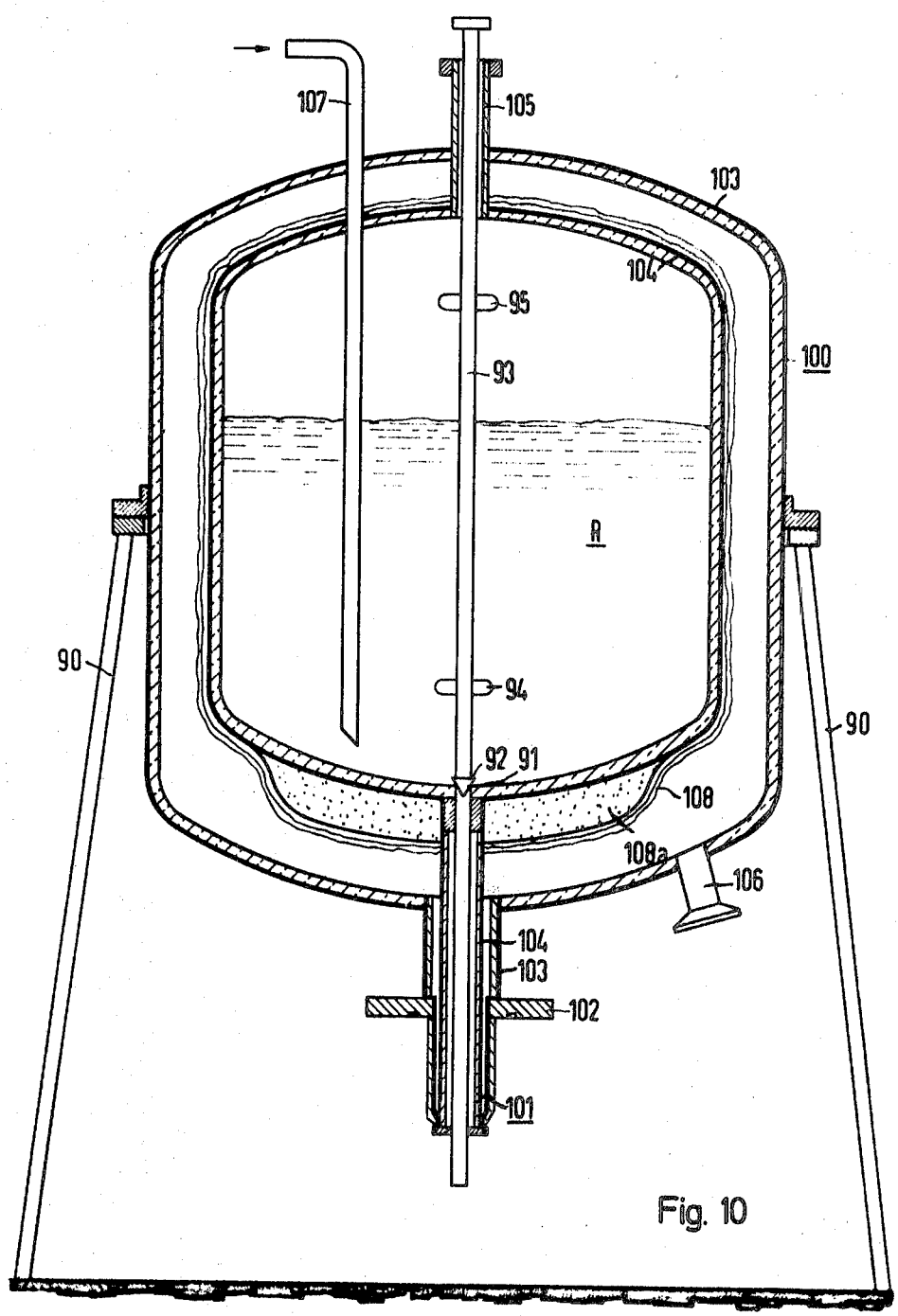
FIG. 10 is a view, partly in section, of the Dewar vessel of the cryostat of the embodiment of FIG. 9.
Figure 11:
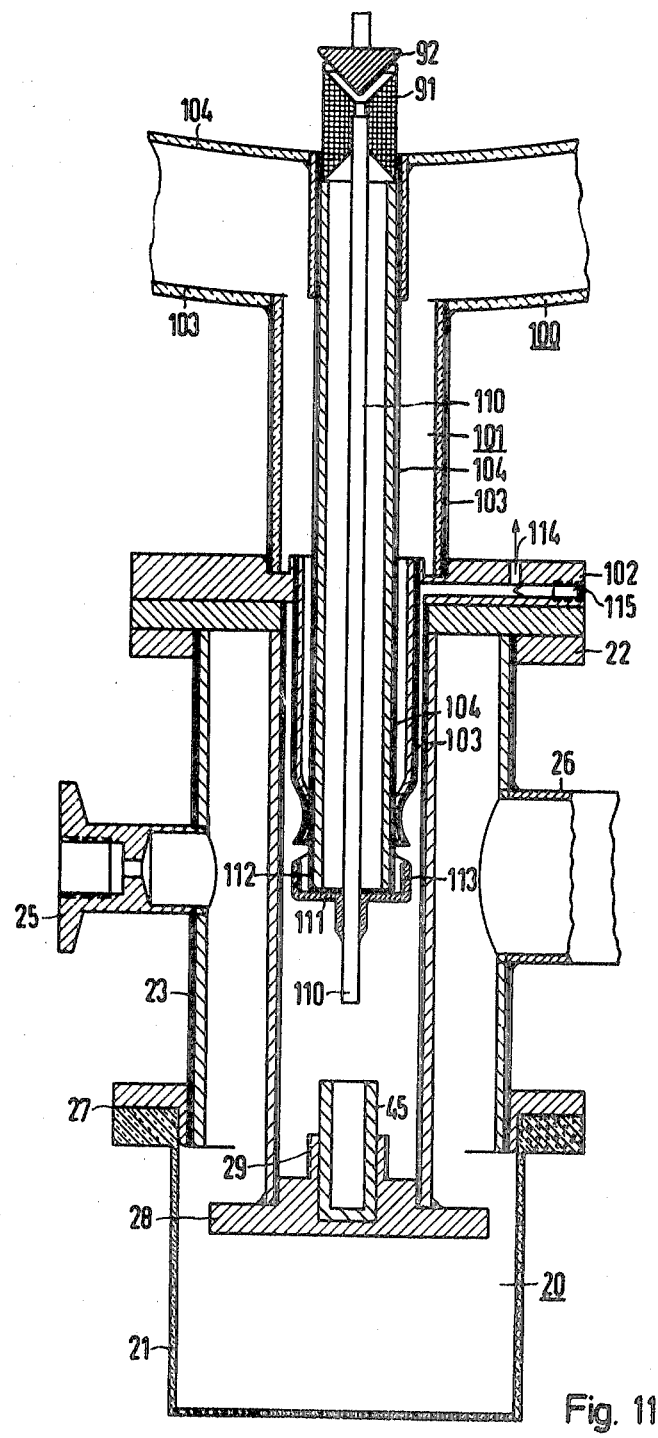
FIG. 11 is an enlarged sectional view of the vacuum chamber of the cryostat of the embodiment of FIG. 9.

In the embodiment of FIG. 9, the vacuum chamber 20 is mounted beneath the Dewar vessel 100. This embodiment of FIGS. 9, 10 and 11 is therefore called a "suspended" embodiment having a linearly extending vacuum chamber. The vacuum chamber 20 of the embodiment of FIG. 9 may be identical with the vacuum chamber of each of the aforedescribed embodiments. The Dewar vessel 100 and the refrigerant transfer device, which are schematically illustrated in section in FIGS. 10 and 11, differ from the Dewar vessel and refrigerant transfer device of each of the aforedescribed embodiments.

The Dewar vessel 100 is positioned in and supported by a stand 90 which may comprise a tripod, for example. The Dewar vessel 100 corresponds to that of the embodiment of FIG. 3 and has an outer wall, jacket or vessel 103 and an inner wall, jacket or vessel 104 spaced from each other by an intermediate space which may be evacuated via a sealing valve 106 via a vacuum pump. The liquid gas refrigerant R is supplied to the inner vessel 104 via an inlet duct or conduit 107. Additional insulation is provided by foils 108, as well as by maintenance of the vacuum between the inner and outer vessels 104 and 103 by activated carbon 108a provided in the space between said inner and outer vessels.

The flange 102 of the nozzle 101 of the Dewar vessel 100 is affixed to the flange 22 of the vacuum chamber 20 to affix or couple said vacuum chamber to said Dewar vessel. A rod 93 is mounted in the Dewar vessel 100 for axial movement and has a valve head 92 affixed to the lower end thereof and positioned in operative proximity with a valve duct 91. The valve 91, 92 on the nozzle 101 of the Dewar vessel controls the gas pressure in the area of the upper end of a tube 110 thereby controlling the flow of refrigerant from the reservoir to said tube by gravitational force. The rod 93 may simultaneously function to indicate the level of the coolant or refrigerant R in the Dewar vessel 100, with the assistance of sensing elements 94 and 95, and others, if desired. The rod 93 is moved in directions along its axis to control the operation of the valve 91, 92, via a lead-in duct 105, through which said rod passes, thereby controlling and indicating the level of the refrigerant or coolant R in the Dewar vessel.

The refrigerant transfer device schematically illustrated in FIG. 11 and extending from the Dewar vessel 100 to the refrigerated surface 28 of the vacuum chamber 20, is basically similar to the arrangement of FIG. 4. In the embodiment of FIG. 11, the coolant R is transferred by gravitational forces, through the tube 110 to the back portion 29 of the refrigerated surface 28. The space between the tube 110 and the inner jacket 104 of the Dewar vessel 100, within the nozzle 101, is tightly sealed first by the valve body 91 and secondly, by a sealing member 111. The sealing member 111 may be welded to the tube 110 or may be threadedly coupled to an inner nozzle tube 104 via threading on the lower end 112 of the nozzle 101. During operation, the flow of liquid coolant R through the tube 110 may be controlled by a valve 114 which is adjustable by a regulating member or threaded member 115, so that only as much coolant will reach the refrigerated surface 28 as can evaporate thereon.

A special advantage of the cryostat device of the embodiment of FIG. 11 of the present invention is that the vacuum chamber 20 may be removed without having to empty the Dewar vessel 100 prior to such removal. All that is necessary to remove the vacuum chamber 20 is to close the valve 91 by movement of the rod 93 (FIG. 10). The vacuum chamber 20 may be uncoupled and replaced, for example, by a vacuum chamber with another radiation detecting crystal or another range of sensitivity or response.

Figure 12:
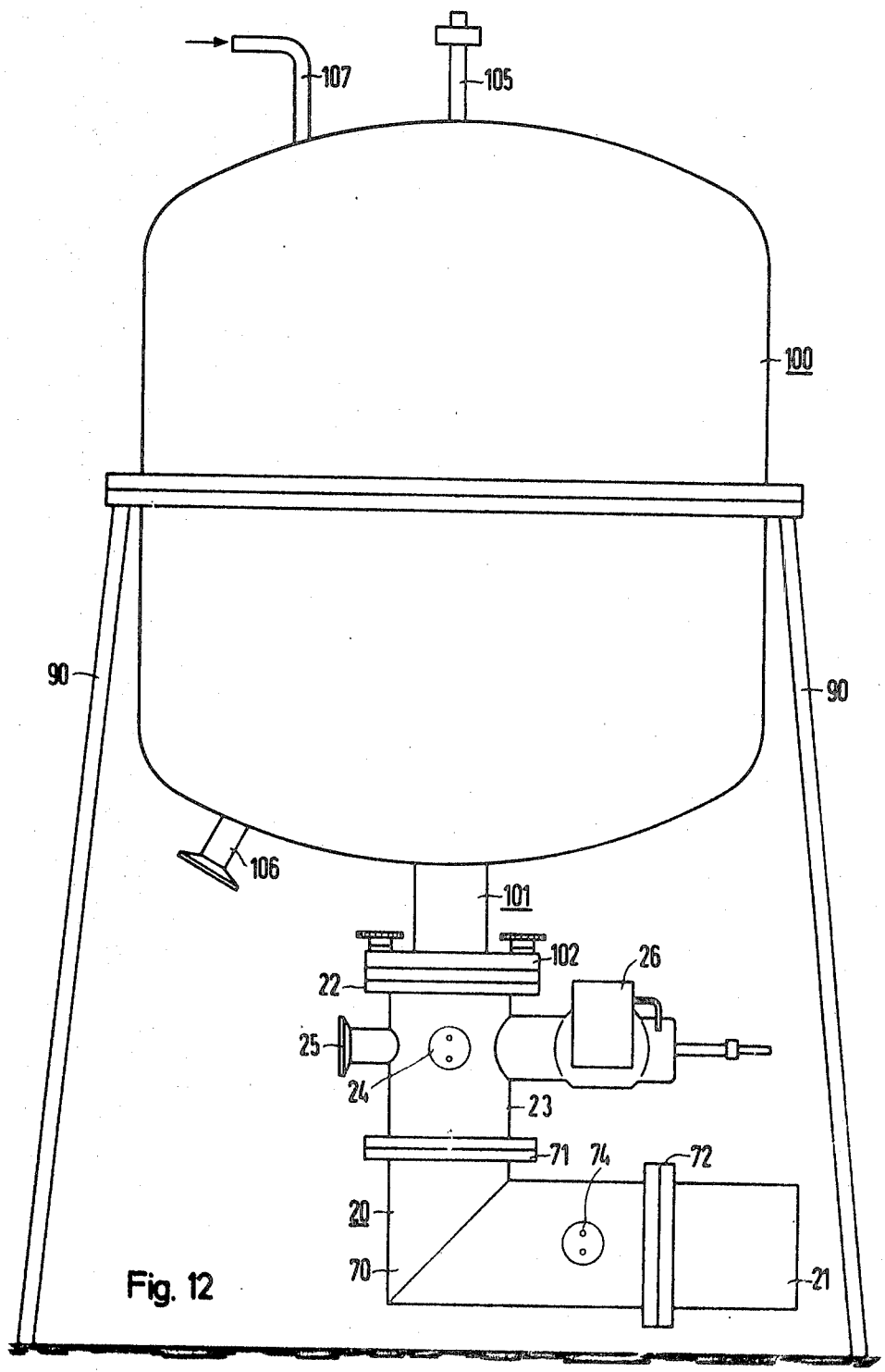
FIG. 12 is a view of the assembled cryostat of still another embodiment of the present invention.

As shown in FIG. 12, the vacuum chamber 20 of angular configuration, as in the embodiment of FIGS. 7 and 8, may be utilized in a suspended embodiment of the cryostat of the present invention. In FIG. 12, as in FIG. 7, the angular joint 70 is connected between the cover 21 and the container 23. The vacuum chamber 20 of FIG. 12 may be identical with that of FIG. 8.

While the invention has been described by means of specific examples and in specific embodiments, we do not wish to be limited thereto, for obvious modifications will occur to those skilled in the art without departing from the spirit and scope of the invention.

We claim:

1. A loosely assembled cryostat of modular construction comprising:

a Dewar vessel having a reservoir of liquid gas refrigerant and a nozzle opening into the area of said reservoir;

refrigerant transfer means; and a vacuum chamber placed directly on the nozzle of the Dewar vessel and coupled to said Dewar vessel via said refrigerant transfer means and cooled by said refrigerant from said reservoir, said vacuum chamber having a refrigerated surface for mounting a radiation detector to be cooled, and electrical and evacuating coupling means for independent evacuation of said vacuum chamber, said refrigerated surface having a back portion, said refrigerant transfer means extending through the nozzle of said Dewar vessel and ending outside said vacuum chamber.

2. A cryostat as claimed in claim 1, wherein said Dewar vessel has a nozzle opening into the area of said reservoir and said refrigerant transfer means includes said nozzle, said nozzle being in operative proximity with the back portion of the refrigerated surface of said vacuum chamber.

3. A cryostat as claimed in claim 2, wherein said vacuum chamber has a recess formed therein in the area of the back portion of the refrigerated surface thereof and said refrigerant transfer means comprises a heat transfer rod extending through the nozzle of said Dewar vessel and having one end immersed in the refrigerant in said Dewar vessel and the other end extending into the recess of said vacuum chamber and removably affixed to the back portion of said refrigerated surface.

4. A cryostat as claimed in claim 3, wherein the heat transfer rod of said refrigerant transfer means comprises copper and said other end of said heat transfer rod is threadedly coupled to the back portion of said refrigerated surface.

5. A cryostat as claimed in claim 3, wherein the nozzle of said Dewar vessel extends therefrom in an area above the level of refrigerant in the reservoir thereof, and the heat transfer rod of the refrigerant transfer means extends through said nozzle with sufficient clearance to enable exhaust gas from the liquid gas refrigerant in said reservoir to pass through said nozzle out of said Dewar vessel into contact with the recess of said vacuum chamber thereby cooling said rod and the refrigerated surface of said vacuum chamber.

6. A cryostat as claimed in claim 2, wherein said vacuum chamber comprises a container having said electrical and evacuating coupling means and having said refrigerated surface therein, and a removable cover for said container comprising material transparent to radiation to be detected by said radiation detector.

7. A loosely assembled cryostat of modular construction comprising:

a Dewar vessel having a reservoir of liquid gas refrigerant and a nozzle opening into the area of the reservoir;

refrigerant transfer means including the nozzle of the Dewar vessel;

a vacuum chamber coupled to the Dewar vessel via the refrigerant transfer means and cooled by said refrigerant from said reservoir, said vacuum chamber having a refrigerated surface for mounting a radiation detector to be cooled, and electrical and evacuating coupling means for independent evacuation of said vacuum chamber, said refrigerated surface having a back portion and the nozzle of the Dewar vessel being in operative proximity with the back portion of the refrigerated surface of the vacuum chamber, said vacuum chamber having a recess formed therein in the area of the refrigerated surface thereof, and said refrigerant transfer means comprising a tube extending through the nozzle of the Dewar vessel and having one end immersed in the refrigerant in said Dewar vessel and the other end extending into the recess of said vacuum chamber in proximity with the back portion of the refrigerated surface of said vacuum chamber whereby said tube transfers refrigerant under pressure to the back portion of the refrigerated surface;

a collar on said tube in the area of said one end thereof; and spring means on said tube in said area thereof and abutting said collar at one end and extending beyond said tube at the other end in a manner whereby said spring means abuts said vacuum chamber while said tube is still free of said vacuum chamber.

8. A cryostat as claimed in claim 7, wherein the nozzle of said Dewar vessel extends therefrom in an area above the level of refrigerant in the reservoir thereof, and said spring means urges said collar into closing relation with the mouth of said nozzle when said spring means abuts said vacuum chamber thereby sealing said Dewar vessel airtight so that said refrigerant is transferred from the reservoir of said Dewar vessel to the back portion of the refrigerated surface of said vacuum chamber via said tube in the manner of an artesian well.

9. A cryostat as claimed in claim 8, wherein said Dewar vessel comprises regulating valve means for controlling the gas pressure in said Dewar vessel thereby regulating the flow of refrigerant from said reservoir to said tube.

10. A cryostat as claimed in claim 8, wherein said Dewar vessel comprises regulating valve means on the nozzle of said Dewar vessel positioned to block the recess of said vacuum chamber when said collar closes the mouth of said nozzle for regulating the flow of refrigerant past the back of the refrigerated surface of said vacuum chamber.

11. A cryostat as claimed in claim 7, wherein said refrigerant transfer means further comprises a heat transfer rod extending through said tube and having one end immersed in the refrigerant in said Dewar vessel and the other end extending into the recess of said vacuum chamber and removably affixed to the back portion of said refrigerated surface.

12. A cryostat as claimed in claim 7, wherein the nozzle of said Dewar vessel extends therefrom in an area below the level of refrigerant in the reservoir thereof, and said Dewar vessel comprises valve means on the nozzle of said Dewar vessel for controlling the gas pressure in the area of said other end of said tube thereby controlling the flow of refrigerant from said reservoir to said tube by gravitational force.

13. A loosely assembled cryostat of modular construction comprising:

a Dewar vessel having a reservoir of liquid gas refrigerant and a nozzle opening into the area of the reservoir;

refrigerant transfer means including the nozzle of the Dewar vessel;

a vacuum chamber coupled to the Dewar vessel via the refrigerant transfer means and cooled by said refrigerant from said reservoir, said vacuum chamber having a refrigerated surface for mounting a radiation detector to be cooled, and electrical and evacuating coupling means for independent evacuation of said vacuum chamber, said refrigerated surface having a back portion and the nozzle of the Dewar vessel being in operative proximity with the back portion of the refrigerated surface of the vacuum chamber, said vacuum chamber comprising a container having said electrical and evacuating coupling means and having the refrigerated surface therein, an angular joint having another refrigerated surface for mounting a radiation detector to be cooled at one end thereof and additional refrigerant transfer means coupled at one end thereof to the refrigerated surface of the container and at the other end thereof to the refrigerated surface of the angular joint, and a removable cover for said angular joint comprsing material transparent to radiation to be detected by the radiation detector.

References Cited

UNITED STATES PATENTS

| 3,166,915 | 1/1965 | Klipping | 62—514 |
| 3,216,210 | 11/1965 | Klipping | 62—514 |
| 3,306,060 | 2/1967 | Klipping | 62—514 |
| 3,330,125 | 7/1967 | Klipping | 62—45 |
| 3,358,472 | 12/1967 | Klipping | 62—45 |

MEYER PERLIN, Primary Examiner